United States Patent
Jiang et al.

(10) Patent No.: US 10,481,428 B2
(45) Date of Patent: Nov. 19, 2019

(54) DISPLAY SUBSTRATE AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Liangliang Jiang, Beijing (CN); Chengpeng Yao, Beijing (CN); Ke Dai, Beijing (CN); Yongjun Yoon, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/787,888

(22) Filed: Oct. 19, 2017

(65) Prior Publication Data

US 2018/0252962 A1 Sep. 6, 2018

(30) Foreign Application Priority Data

Mar. 1, 2017 (CN) .......................... 2017 1 0118123

(51) Int. Cl.
*G02F 1/1335* (2006.01)
*G02F 1/1362* (2006.01)

(52) U.S. Cl.
CPC .. *G02F 1/133514* (2013.01); *G02F 1/133617* (2013.01); *G02F 1/133621* (2013.01);
(Continued)

(58) Field of Classification Search
CPC ......... G02F 1/133514; G02F 1/133621; G02F 1/133603; G02F 2001/136222;
(Continued)

(56) References Cited

U.S. PATENT DOCUMENTS 4,678,285 A 7/1987 Ohta et al.
2007/0164956 A1* 7/2007 Araki .................... G02F 1/1395
345/90
(Continued)

FOREIGN PATENT DOCUMENTS

| CN | 1484071 A | 3/2004 |
|---|---|---|
| CN | 104267520 A | 1/2015 |
| CN | 105446009 A | 3/2016 |

OTHER PUBLICATIONS

Chongfeng Guo, et al., Photoluminescence Properties and Crystallographic Sites of Ce3+ in Ca2BO3Cl, Jan. 22, 2010, The Electrochemical Society, 13 (4) J28-J31 (Year: 2010).*
(Continued)

*Primary Examiner* — Sonji N Johnson
(74) *Attorney, Agent, or Firm* — Brooks Kushman P.C.

(57) ABSTRACT

The present disclosure provides a display substrate and a display device. Each pixel unit includes: a blue sub-pixel, a transparent color filter layer being arranged in the blue subpixel and configured to allow a blue light beam to be transmitted therethrough toward the display substrate; a red subpixel, a red fluorescent powder layer being arranged in the red subpixel and configured to emit a red light beam under the excitation of the blue light beam; a green subpixel, a green fluorescent powder layer being arranged in the green subpixel and configured to emit a green light beam under the excitation of the blue light beam; and a yellow subpixel, a yellow fluorescent powder layer being arranged in the yellow subpixel and configured to emit a yellow light beam under the excitation of the blue light beam.

15 Claims, 6 Drawing Sheets

(52) U.S. Cl.
CPC ...... *G02F 1/1362* (2013.01); *G02F 1/133603* (2013.01); *G02F 1/133609* (2013.01); *G02F 2001/133614* (2013.01); *G02F 2001/133624* (2013.01); *G02F 2001/136222* (2013.01)

(58) Field of Classification Search
CPC ....... G02F 1/1362; G02F 2001/133614; G02F 1/133617; G02F 1/133609; G02F 2001/133624
See application file for complete search history.

(56) References Cited

U.S. PATENT DOCUMENTS

| | | |
|---|---|---|
| 2016/0041429 A1 | 2/2016 | Wang et al. |
| 2018/0045384 A1* | 2/2018 | Uno .......................... F21S 2/00 |
| 2018/0231830 A1 | 8/2018 | Wu et al. |
| 2018/0252962 A1* | 9/2018 | Jiang ................. G02F 1/133514 |

OTHER PUBLICATIONS

First Office Action for Chinese Application No. 201710118123.9, dated Mar. 1, 2019, 9 Pages.

* cited by examiner

US 10,481,428 B2

DISPLAY SUBSTRATE AND DISPLAY DEVICE

CROSS-REFERENCE TO RELATED APPLICATION

This application claims priority to Chinese Patent Application No. 201710118123.9 filed on Mar. 1, 2017, which is incorporated herein by reference in its entirety.

TECHNICAL FIELD

The present disclosure relates to the field of display technology, in particular to a display substrate and a display device.

BACKGROUND

As a passive light-emitting flat-panel display device, a thin film transistor-liquid crystal display (TFT-LCD) needs to be cooperate with a backlight source so as to operate normally, because liquid crystal molecules are incapable of emitting light. White light from the backlight source passes through a first substrate (e.g., an array substrate), a liquid crystal layer and a second substrate (e.g., a color filter substrate) sequentially, so as to achieve a full-color display and grayscale brightness. However, a conventional structure is relatively complex, and thereby the light-emitting efficiency is relatively low.

SUMMARY

In one aspect, the present disclosure provides in some embodiments a display substrate, including a plurality of pixel units. Each pixel includes: a blue sub-pixel; a transparent color filter layer arranged in the blue subpixel and configured to allow a blue light beam to be transmitted therethrough toward the display substrate; a red subpixel; a red fluorescent powder layer arranged in the red subpixel and configured to emit a red light beam under the excitation of the blue light beam; a green subpixel; a green fluorescent powder layer arranged in the green subpixel and configured to emit a green light beam under the excitation of the blue light beam; a yellow subpixel; and a yellow fluorescent powder layer arranged in the yellow subpixel and configured to emit a yellow light beam under the excitation of the blue light beam.

In a possible embodiment of the present disclosure, a transparent color filter layer is further arranged in the red subpixel, and the transparent color filter layer and the red fluorescent powder layer are arranged one on another; or the red fluorescent powder layer is made of a transparent color filter layer doped with a red fluorescent powder.

In a possible embodiment of the present disclosure, the red fluorescent powder layer or the red fluorescent powder is made of Ru-doped $Y_2O_3$.

In a possible embodiment of the present disclosure, a transparent color filter layer is further arranged in the green subpixel, and the transparent color filter layer and the green fluorescent powder layer are arranged one on another; or the green fluorescent powder layer is made of a transparent color filter layer doped with a green fluorescent powder.

In a possible embodiment of the present disclosure, the green fluorescent powder layer or the green fluorescent powder is made of Ru-doped $SrGa_2S_4$.

In a possible embodiment of the present disclosure, a transparent color filter layer is further arranged in the yellow subpixel, and the transparent color filter layer and the yellow fluorescent powder layer are arranged one on another; or the yellow fluorescent powder layer is made of a transparent color filter layer doped with a yellow fluorescent powder.

In a possible embodiment of the present disclosure, the display substrate further includes a protection layer covering the pixel unit, and the transparent color filter layer arranged in the blue subpixel is formed integrally with the protection layer.

In a possible embodiment of the present disclosure, the transparent color filter layer is made of transparent resin, polymethyl methacrylate or polycarbonate.

In a possible embodiment of the present disclosure, the display substrate is a color filter substrate or a color filter on array (COA) substrate.

In another aspect, the present disclosure provides in some embodiments a display device including the above-mentioned display substrate and a blue backlight source arranged at a light-entering side of the display substrate.

In a possible embodiment of the present disclosure, the blue backlight source is a blue-light Light-Emitting Diode (LED) chip.

In a possible embodiment of the present disclosure, a blue light beam from the blue backlight source has a wavelength of (440±30) nm.

In a possible embodiment of the present disclosure, a red light beam emitted by the red subpixel under the excitation of the blue light beam has a wavelength of (700±30) nm; and/or a green light beam emitted by the green subpixel under the excitation of the blue light beam has a wavelength of (530±30) nm; and/or a yellow light beam emitted by the yellow subpixel under the excitation of the blue light beam has a wavelength of (580±30) nm.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
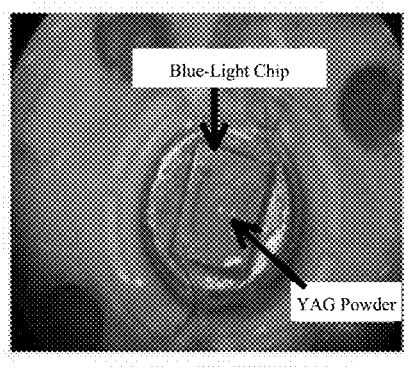
FIG. 1 is a schematic view showing a packaged white-light LED (a blue-light chip+an yttrium aluminum garnet (YAG) fluorescent powder)

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. It should be appreciated that, those terms having common meanings defined in a dictionary shall be construed as having an identical meaning in the context, but shall not be interpreted idealistically and extremely. For example, such words as "comprise" and "include" are used to indicate that an element or item before the words covers element(s) or item(s) or equivalents thereof listed hereinafter, with any other elements or items being not excluded. In addition, each pixel unit of a color filter substrate involved in the embodiments of the present disclosure has a very small size, and for clarification, the size of each structure in the drawings has been enlarged, rather than to reflect an actual size or scale.

Figure 2:
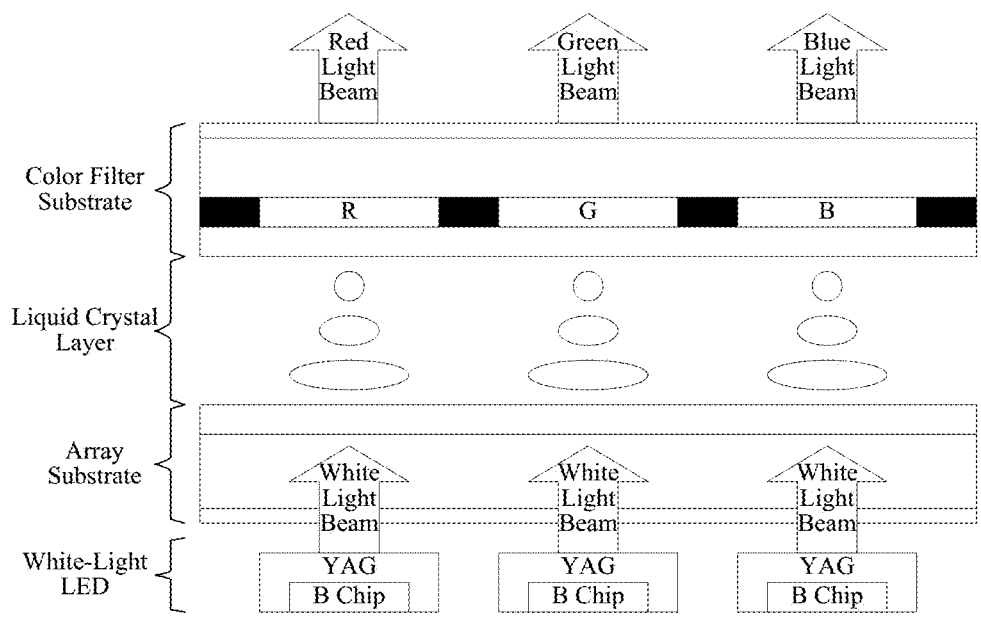
FIG. 2 is a schematic view showing a light-emitting mode of a Red (R)/Green (G)/Blue (B)-type liquid crystal display device.

Currently, a white-light LED backlight source for a TFT-LCD emits a white light beam mainly in the following way. As shown in FIG. 1, a blue-light chip serves as an excitation source, and a YAG ($Y_3Al_5O_{12}$) layer is coated onto the blue-light chip. Under the excitation of an electric field, the blue-light chip may emit a blue light beam, so as to excite a YAG fluorescent powder on a surface thereof to emit a yellow light beam. The blue light beam and the yellow light beam may then be mixed so as to form the white light beam having a wavelength of 380 to 780 nm. As shown in FIG. 2, the white light beam from the white-light LED backlight source passes through an array substrate, a liquid crystal layer and R/G/B subpixels of a color filter substrate sequentially, so as to provide a colorful image with controllable brightness.

Figure 3:
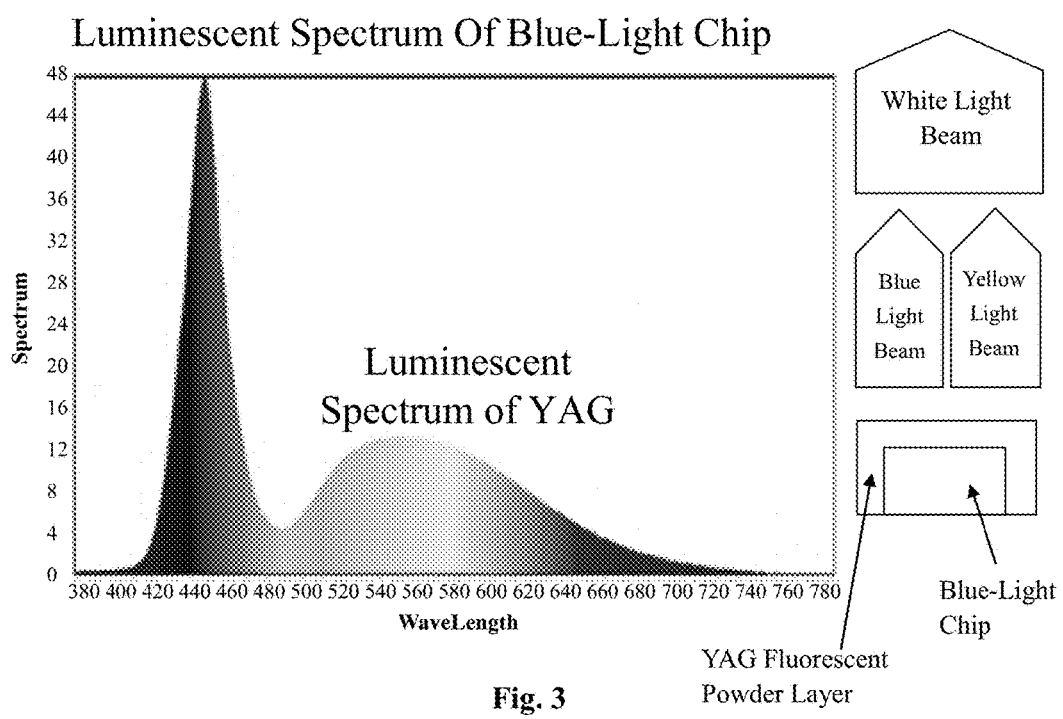
FIG. 3 is a schematic view showing a luminescent spectrum of a white-light LED backlight source.

FIG. 3 shows a luminescent spectrum of the white-light LED backlight source. A sharp and narrow emission peak within a wavelength range of 440 to 450 nm and a wide emission peak within a wavelength range of 500 to 650 m correspond to an emission peak of the blue light beam from the blue-light chip and an emission peak of the yellow light beam from the YAG fluorescent powder respectively. A utilization rate of the blue light beam is merely about 50%.

Figure 4:
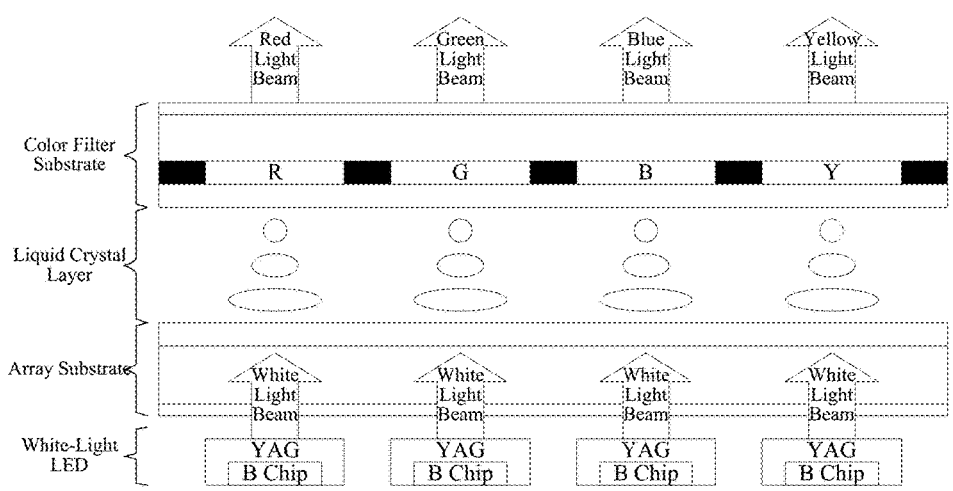
FIG. 4 is a schematic view showing a light-emitting mode of a Red (R)/Green (G)/Blue (B)/Yellow (Y)-type liquid crystal display device.
Figure 5:
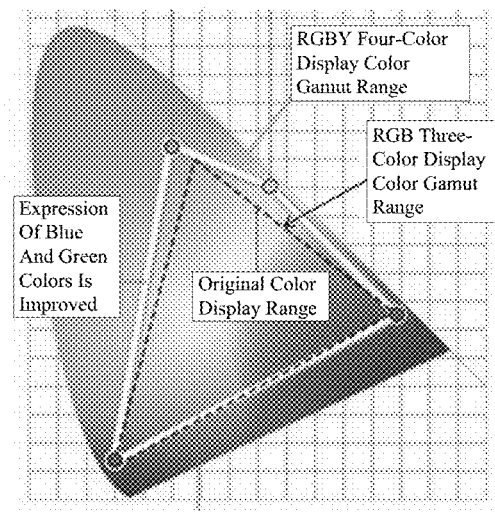
FIG. 5 is a schematic view showing display color gamuts of a R/G/B technology and a R/G/B/Y technology.

As shown in FIG. 4, in order to further improve a color display effect of the LCD, currently a yellow subpixel is added on the basis of the conventional R/G/B subpixels, so as to form four color subpixels, i.e., RGBY subpixels. As a new-generation technique, it is able for the four subpixels to provide a wider display color gamut. As shown in FIG. 5, it is able to improve the image quality, especially in the case of displaying gold and yellow images.

However, for the white light beams emitting by the white-light LED and having wavelengths in the range of 380 nm to 780 nm, merely parts of the white light beams having wavelengths allowed to be transmitted through the color filter substrate may be utilized, and the other white light beams may be filtered out, i.e., a utilization rate of the white light beams is relatively low.

Figure 6:
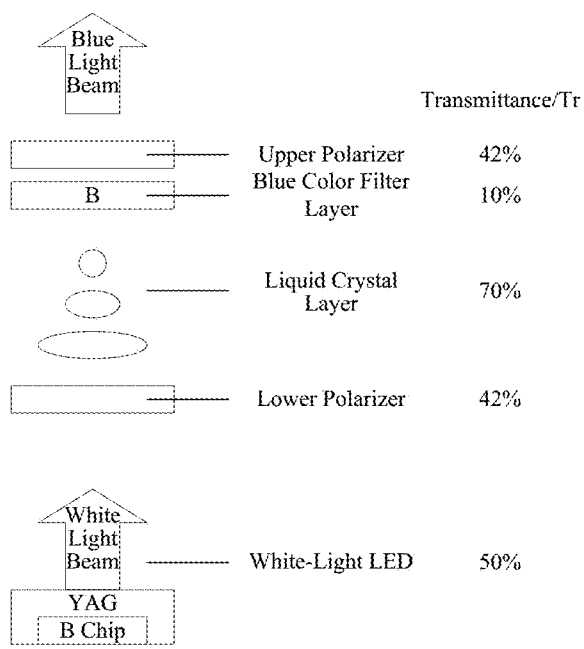
FIG. 6 is a schematic view showing light utilization rates of a blue subpixel.

For the blue subpixel, the white light beam from the white-light LED is formed by mixing the blue light beam from the blue-light chip and the yellow light beam emitted by the YAG fluorescent powder under the excitation of the blue light beam, and then the white light beam is filtered out by a blue color filter layer to form the blue light beam. Hence, the conversion is complex and the luminescent efficiency may be reduced obviously. As shown in FIG. 6, from the white light beams emitted by the backlight source to the blue light beam emitted by the blue subpixel, a light transmittance of the composite white light beam is about 50%, a light transmittance of the white light beam passing through a lower polarizer is about 42%, a light transmittance of the white light beam passing through the liquid crystal layer is about 70%, a light transmittance of the white light beam passing through the blue color filter layer of the color filter substrate is about 10%, and a light transmittance of the white light beam passing through an upper polarizer is about 42%. Finally, a light transmittance of the blue light beam from the blue subpixel is merely about 0.6%.

Figure 7:
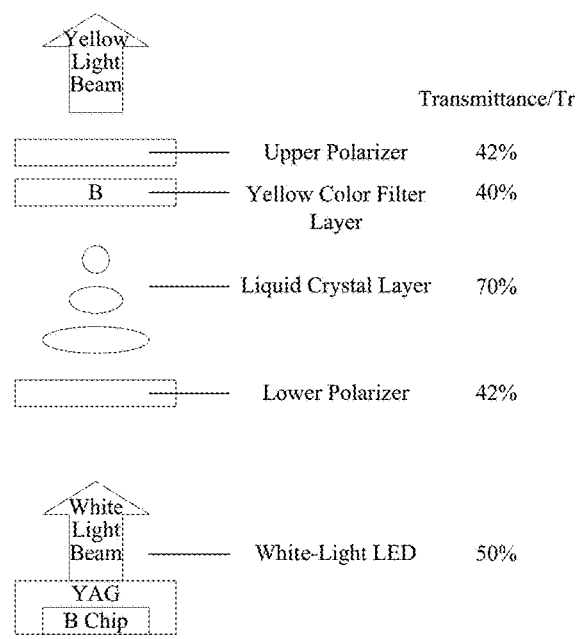
FIG. 7 is a schematic view showing light utilization rates of a yellow subpixel.

For the yellow subpixel, a yellow color filter layer can merely use the white light beams within the range of 550 to 610 nm, and the other white light beams may be filtered out. The white light beam from the white-light LED is formed by mixing the blue light beam from the blue-light chip and the yellow light beam emitted by the YAG fluorescent powder under the excitation of the blue light beam, and then the white light beam is filtered out by the yellow color filter layer to form the yellow light beam. Hence, the conversion is complex and the luminescent efficiency may be reduced obviously. As shown in FIG. 7, from the white light beams emitted by the backlight source to the yellow light beam emitted by the yellow subpixel, a light transmittance of the composite white light beam is about 50%, a light transmittance of the white light beam passing through a lower polarizer is about 42%, a light transmittance of the white light beam passing through the liquid crystal layer is about 70%, a light transmittance of the white light beam passing through the yellow color filter layer of the color filter substrate is about 40%, and a light transmittance of the white light beam passing through an upper polarizer is about 42%. Finally, a light transmittance of the blue light beam from the yellow subpixel is merely about 2.5%.

Figure 8:
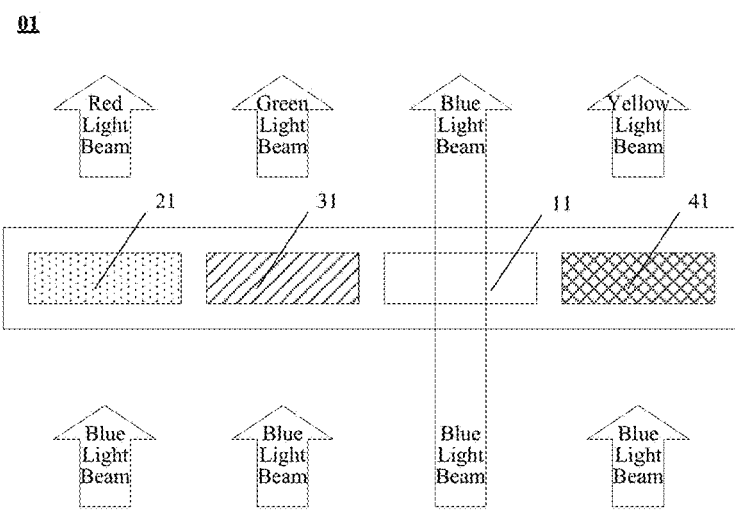
FIG. 8 is a schematic view showing a light-emitting mode of a display substrate according to one embodiment of the present disclosure.

In order to overcome the above-mentioned defects, the present disclosure provides in some embodiments a display substrate 01 which, as shown in FIG. 8, includes a plurality of pixel units. Each pixel unit includes: a blue sub-pixel 10; a transparent color filter layer 11 arranged in the blue subpixel 10 and configured to allow a blue light beam to be transmitted therethrough toward the display substrate 01; a red subpixel 20; a red fluorescent powder layer 21 arranged in the red subpixel 20 and configured to emit a red light beam under the excitation of the blue light beam; a green subpixel 30; a green fluorescent powder layer 31 arranged in the green subpixel 30 and configured to emit a green light beam under the excitation of the blue light beam; a yellow subpixel 40; and a yellow fluorescent powder layer 41 arranged in the yellow subpixel and configured to emit a yellow light beam under the excitation of the blue light beam.

It should be appreciated that, the blue light beam has a relatively small wavelength (430 to 470 nm) and relatively large energy, so it is capable of being used to excite the red fluorescent powder layer 21, the green fluorescent powder layer 31 and the yellow fluorescent powder layer 41 to emit the red light beam (having a wavelength of 620 to 780 nm), the green light beam (having a wavelength of 500 to 560 nm) and the yellow light beam (having a wavelength of 560 to 590 nm) respectively. However, it is impossible to emit the blue light beam having relatively large energy under the excitation of the red light beam, green light beam or yellow light beam having relatively small energy. Hence, a blue backlight source may be applied to the display substrate 01.

Here, an arrangement mode of the R/G/B/Y subpixels of the display substrate 01 will not be particularly defined. For example, they may be arranged in a line, a mosaic form or a Delta form.

The display substrate 01 may be a color filter substrate or a COA substrate (where the color filter substrate is integrated into an array substrate)

According to the display substrate 01 in the embodiments of the present disclosure, the blue light source (e.g., the blue-light chip) serves as a backlight source, and it is unnecessary to apply the YAG fluorescent powder onto a surface of the blue-light chip. As compared with the related art where several filtering and light-emitting steps, i.e., blue light beam (blue-light chip)→yellow light beam (YAG fluorescent powder)→white light beam (blue light beam+yellow light beam)→white grayscale (liquid crystal layer)→R/G/B/Y color filter layers, are required, in the embodiments of the present disclosure, a direct excitation step, i.e., blue light beam (blue-light chip)→blue grayscale (liquid crystal layer)→red fluorescent powder layer/green fluorescent powder layer/transparent color filter layer in blue subpixel/yellow fluorescent powder layer, is used, so it is able to remarkably increase the luminescent efficiency and the utilization rate of the backlight. Especially for the blue subpixel, the blue light beam from the backlight source may directly pass through the transparent color filter layer without any additional filtration step, so the light transmittance of the blue light beam from the blue subpixel may be also 100%, i.e., the blue light beam may be utilized completely so as to provide the blue light beam at a high brightness value. With respect to the yellow subpixel, the blue light beam from the backlight source, after being subjected to grayscale adjustment by the liquid crystal layer, may be used to directly excite the yellow fluorescent powder layer in the yellow subpixel to emit the yellow light beam. In this way, it is able to optimize the light-emitting step, remarkably reduce the backlight loss, and significantly improve the luminescent efficient and the utilization rate.

In a possible embodiment of the present disclosure, a transparent color filter layer is further arranged in the red subpixel 20, and the transparent color filter layer and the red fluorescent powder layer 21 are arranged one on another; or the red fluorescent powder layer 21 is made of a transparent color filter layer doped with a red fluorescent powder. In other words, the red fluorescent powder may be doped into the transparent color filter layer (e.g., resin photoresist), and then the transparent color filter layer may be exposed and developed, so as to be deposited onto a base substrate of the display substrate. The red fluorescent powder may be made of Ru-doped $Y_2O_3$, i.e., $Y_2O_3$:Ru.

Similar to the structure of the red subpixel 20, a transparent color filter layer may be further arranged in the green subpixel 30, and the transparent color filter layer and the green fluorescent powder layer 31 are arranged one on another; or the green fluorescent powder layer 31 is made of a transparent color filter layer doped with a green fluorescent powder. In other words, the green fluorescent powder may be doped into the transparent color filter layer (e.g., resin photoresist), and then the transparent color filter layer may be exposed and developed, so as to be deposited onto the base substrate of the display substrate. The green fluorescent powder may be made of Ru-doped $SrGa_2S_4$, i.e., $SrGa_2S_4$:Ru.

Similar to the structures of the red subpixel 20 and the green subpixel 30, a transparent color filter layer may be further arranged in the yellow subpixel 40, and the transparent color filter layer and the yellow fluorescent powder layer 41 are arranged one on another; or the yellow fluorescent powder layer 41 is made of a transparent color filter layer doped with a yellow fluorescent powder. In other words, the yellow fluorescent powder may be doped into the transparent color filter layer (e.g., resin photoresist), and then the transparent color filter layer may be exposed and developed, so as to be deposited onto the base substrate of the display substrate. The yellow fluorescent powder may be made of Ce-doped $(Y_{1-a}Gd_a)_3(Al_{1-b}Ga_b)O_{12}$, i.e., $(Y_{1-a}Gd_a)_3(Al_{1-b}Ga_b)O_{12}$:$Ce^{3+}$.

Further, the transparent color filter layer arranged in each subpixel may be made of transparent resin, polymethyl methacrylate (PMMA), or polycarbonate (PC).

The array substrate 01 further includes a protection layer covering the pixel unit, and the transparent color filter layer 11 arranged in the blue subpixel 10 is formed integrally with the protection layer. In other words, the red subpixel, the green subpixel and the yellow subpixel may be formed at first, and the blue subpixel may be arranged at a blank region. Then, the protection layer covering the subpixels may be formed, and a portion of the protection layer at a region corresponding to the blue subpixel just forms the transparent color filter layer 11 in the blue subpixel 10.

The display substrate 01 will be described hereinafter in conjunction with two embodiments.

As shown in FIG. 8, the display substrate 01 is a color filter substrate and includes a plurality of pixel unit. Each pixel unit includes: the blue sub-pixel 10; the transparent color filter layer 11 arranged in the blue subpixel 10 and configured to allow the blue light beam to be transmitted therethrough toward the display substrate 01; the red subpixel 20; the red fluorescent powder layer 21 arranged in the red subpixel 20 and configured to emit the red light beam under the excitation of the blue light beam; the green subpixel 30; the green fluorescent powder layer 31 arranged in the green subpixel 30 and configured to emit the green light beam under the excitation of the blue light beam; the yellow subpixel 40; and the yellow fluorescent powder layer 41 arranged in the yellow subpixel 40 and configured to emit the yellow light beam under the excitation of the blue light beam.

The transparent color filter 11 in the blue subpixel 10 is a colorless, transparent over coat (OC) made of resin.

The red subpixel 20, the green subpixel 30, the blue subpixel 10 and the yellow subpixel 40 may each be formed by doping a corresponding fluorescent powder into white, transparent resin photoresist, and then exposing and developing the fluorescent powder so as to deposit it onto a base substrate of the color filter substrate. However, it should be appreciated that, the different fluorescent powders may be deposited in any order, and a thickness of each subpixel maybe set in accordance with a color gamut and a coordinates specification of a white point, which will not be particularly defined herein.

In addition, an array substrate may be arranged opposite to the color filter substrate, a liquid crystal layer may be arranged therebetween, and a backlight module (which emits a blue light beam through a blue-light LED chip) maybe arranged at a side of the array substrate away from the liquid crystal layer. Further, an upper polarizer and a lower polarizer may also be provided.

A light source in the backlight module is a pure-blue-light chip (which emits the blue light beam having a wavelength of 440±30 nm, and no conventional YAG fluorescent powder is applied onto a surface of the chip. In the case that the blue light beam passes through the red subpixel and the green subpixel, the red fluorescent powder and the green fluorescent powder in the subpixels may be excited so as to emit the red light beam and the green light beam respectively.

Figure 9:
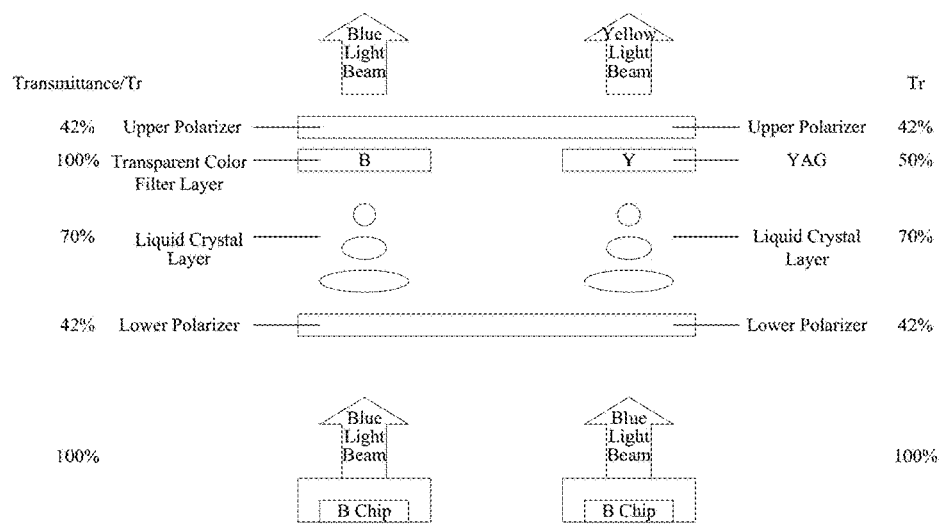
FIG. 9 is a schematic view showing light utilization rates of a blue light beam and a yellow light beam according to one embodiment of the present disclosure.

As shown in FIG. 9, in the case that the blue light beam passes through the transparent color filter layer 11 in the blue subpixel 10, a resultant light transmittance may be about 100%, so it is able for the blue subpixel to provide the blue light beam at a high brightness value. In the case that the blue light beam passes through the yellow subpixel 40, the yellow fluorescent powder may be directly excited to emit the yellow light beam. As a result, it is able to remarkably increase the luminescent efficiency of the blue light beam from the backlight source and achieve the direct excitation, i.e., blue light beam (blue-light chip)→blue grayscale (liquid crystal layer)→yellow light beam (e.g., YAG fluorescent powder), thereby to significantly increase the luminescent efficiency and the utilization rate of the entire backlight source, especially for the blue light beam.

Figure 10:
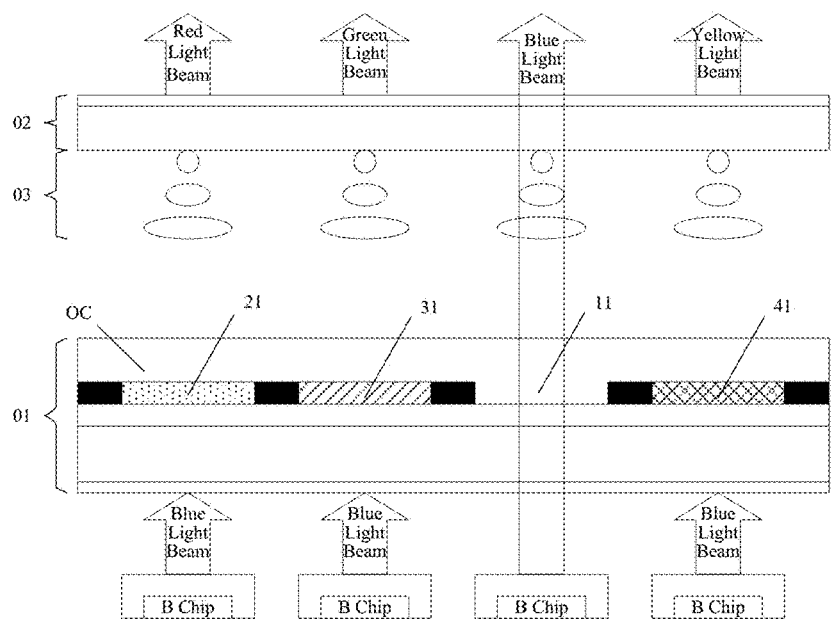
FIG. 10 is another schematic view showing the light-emitting mode of the display substrate according to one embodiment of the present disclosure.

As shown in FIG. 10, the display substrate 01 is a COA substrate and includes an array substrate into which a plurality of pixel unit is integrated. Each pixel unit includes: the blue sub-pixel 10; the transparent color filter layer 11 arranged in the blue subpixel 10 and configured to allow the blue light beam to be transmitted therethrough toward the display substrate 01; the red subpixel 20; the red fluorescent powder layer 21 arranged in the red subpixel 20 and configured to emit the red light beam under the excitation of the blue light beam; the green subpixel 30; the green fluorescent powder layer 31 arranged in the green subpixel 30 and configured to emit the green light beam under the excitation of the blue light beam; the yellow subpixel 40; and the yellow fluorescent powder layer 41 arranged in the yellow subpixel and configured to emit the yellow light beam under the excitation of the blue light beam.

The transparent color filter 11 in the blue subpixel 10 is a colorless, transparent OC made of resin.

The red subpixel 20, the green subpixel 30, the blue subpixel 10 and the yellow subpixel 40 may each be formed by doping a corresponding fluorescent powder into white, transparent resin photoresist, and then the photoresist may be exposed and developed so as to deposit it onto a base substrate of the color filter substrate. However, it should be appreciated that, the different fluorescent powders may be deposited in any order, and a thickness of each subpixel maybe set in accordance with a color gamut and a coordinates specification of a white point, which will not be particularly defined herein.

In addition, a glass cover substrate 02 may be arranged opposite to the COA substrate, a liquid crystal layer 03 may be arranged therebetween, and a backlight module (which emits a blue light beam through a blue-light LED chip) maybe arranged at a side of the array substrate away from the liquid crystal layer. Further, an upper polarizer and a lower polarizer may also be provided.

A light source in the backlight module is a pure-blue-light chip (which emits the blue light beam having a wavelength of 440±30 nm, and no conventional YAG fluorescent powder is applied onto a surface of the chip. In the case that the blue light beam passes through the red subpixel and the green subpixel, the red fluorescent powder and the green fluorescent powder in the subpixels may be excited so as to emit the red light beam and the green light beam respectively.

As shown in FIG. 10, in the case that the blue light beam passes through the transparent color filter layer 11 in the blue subpixel 10, a resultant light transmittance may be about 100%, so it is able for the blue subpixel to provide the blue light beam at a high brightness value. In the case that the blue light beam passes through the yellow subpixel 40, the yellow fluorescent powder may be directly excited to emit the yellow light beam. As a result, it is able to remarkably increase the luminescent efficiency of the blue light beam from the backlight source and achieve the direct excitation, i.e., blue light beam (blue-light chip)→blue grayscale (liquid crystal layer)→yellow light beam (e.g., YAG fluorescent powder), thereby to significantly increase the luminescent efficiency and the utilization rate of the entire backlight source. The blue light beam has the largest utilization rate, about 12%(% (while in the related art the blue light beam has a utilization rate of 0.6%), and the yellow light beam has a utilization rate of 6.0% (while in the related art the yellow light beam has a utilization rate of 2.5%).

The present disclosure further provides in some embodiments a display device including the above-mentioned display substrate and a blue backlight source arranged at a light-entering side of the display substrate. The display device may be a liquid crystal display device, e.g., any product or member having a display function such as a liquid crystal display, a liquid crystal television, a digital photo frame, a mobile phone, a flat-panel computer or a navigator.

Figure 11:
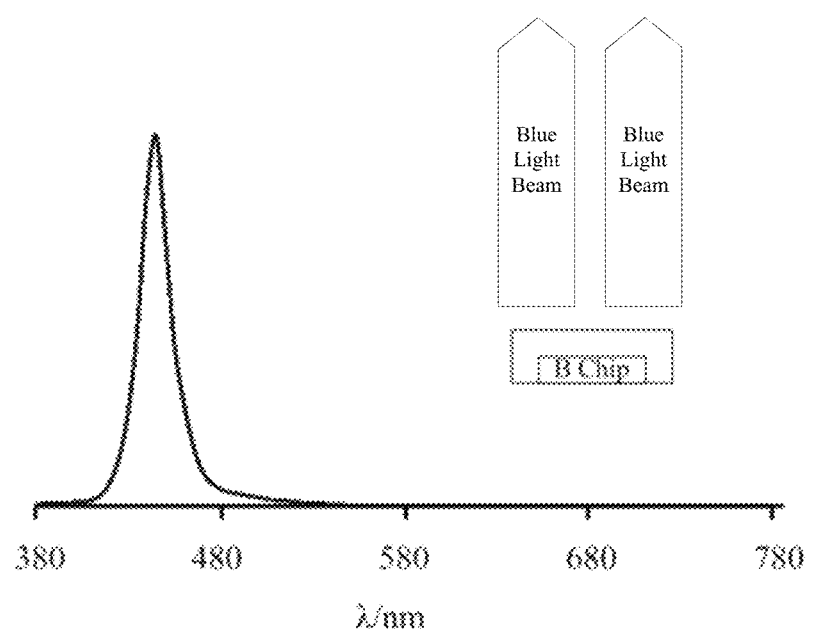
FIG. 11 is a schematic view showing a light-emitting mode of a pure-blue-light LED backlight source according to one embodiment of the present disclosure.

Further, the blue backlight source is a blue-light LED chip capable of emitting the blue light beam having a wavelength of (440±30)nm. As shown in FIG. 11, which is schematic view showing a light-emitting mode of a pure-blue-light LED backlight source, the blue light beam at the mentioned wavelength has a sharp emission peak, a narrow half-peak breadth, and high color purity, so it is able to display an image at a high color gamut.

Further, the red light beam emitted by the red subpixel under the excitation of the blue light beam has a wavelength of (700±30) nm; and/or the green light beam emitted by the green subpixel under the excitation of the blue light beam has a wavelength of (530±30) nm; and/or the yellow light beam emitted by the yellow subpixel under the excitation of the blue light beam has a wavelength of (580±30) nm, so it is able for the R/G/B/Y liquid crystal display device to achieve a full-color high-color-gamut display effect to the greatest extent.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate, comprising a plurality of pixel units and a protection layer covering the plurality of pixel units, wherein each pixel unit comprises:
   a blue subpixel; a transparent color filter layer being arranged in the blue subpixel and configured to allow a blue light beam to be transmitted therethrough toward the display substrate;

a red subpixel; a red fluorescent powder layer being arranged in the red subpixel and configured to emit a red light beam under the excitation of the blue light beam;

a green subpixel; a green fluorescent powder layer being arranged in the green subpixel and configured to emit a green light beam under the excitation of the blue light beam; and a yellow subpixel; a yellow fluorescent powder layer being arranged in the yellow subpixel and configured to emit a yellow light beam under the excitation of the blue light beam;

wherein the transparent color filter layer arranged in the blue subpixel is formed integrally with the protection layer.

2. The display substrate according to claim 1, wherein a transparent color filter layer is further arranged in the red subpixel, and the transparent color filter layer and the red fluorescent powder layer are arranged one on another; or the red fluorescent powder layer is made of a transparent color filter layer doped with a red fluorescent powder.

3. The display substrate according to claim 2, wherein the red fluorescent powder layer or the red fluorescent powder is made of Ru-doped $Y_2O_3$.

4. The display substrate according to claim 1, wherein a transparent color filter layer is further arranged in the green subpixel, and the transparent color filter layer and the green fluorescent powder layer are arranged one on another; or the green fluorescent powder layer is made of a transparent color filter layer doped with a green fluorescent powder.

5. The display substrate according to claim 4, wherein the green fluorescent powder layer or the green fluorescent powder is made of Ru-doped $SrGa_2S_4$.

6. The display substrate according to claim 1, wherein a transparent color filter layer is further arranged in the yellow subpixel, and the transparent color filter layer and the yellow fluorescent powder layer are arranged one on another; or the yellow fluorescent powder layer is made of a transparent color filter layer doped with a yellow fluorescent powder.

7. The display substrate according to claim 6, wherein the yellow fluorescent powder is made of Ce-doped $(Y_{1-a}Gd_a)_3(Al_{1-b}Ga_b)O_{12}$.

8. The display substrate according to claim 1, wherein the transparent color filter layer is made of transparent resin, polymethyl methacrylate or polycarbonate.

9. The display substrate according to claim 1, wherein the display substrate is a color filter substrate or a color filter on array (COA) substrate.

10. A display device, comprising the display substrate according to claim 1 and a blue backlight source arranged at a light-entering side of the display substrate.

11. The display device according to claim 10, wherein the blue backlight source is a blue-light Light-Emitting Diode (LED) chip.

12. The display device according to claim 10, wherein a blue light beam from the blue backlight source has a wavelength of (440±30) nm.

13. The display device according to claim 12, wherein a red light beam emitted by the red subpixel under the excitation of the blue light beam has a wavelength of (700±30) nm.

14. The display device according to claim 12, wherein a green light beam emitted by the green subpixel under the excitation of the blue light beam has a wavelength of (530±30) nm.

15. The display device according to claim 12, wherein a yellow light beam emitted by the yellow subpixel under the excitation of the blue light beam has a wavelength of (580±30) nm.

* * * * *